US008622633B2

(12) United States Patent
Kowatsch

(10) Patent No.: US 8,622,633 B2
(45) Date of Patent: Jan. 7, 2014

(54) CONNECTOR FOR OPTICAL FIBERS

(75) Inventor: Martin Kowatsch, Freudental (DE)

(73) Assignee: Avanex Corporation, Fremont, CA (US)

( * ) Notice: Subject to any disclaimer, the term of this patent is extended or adjusted under 35 U.S.C. 154(b) by 3497 days.

(21) Appl. No.: 10/189,408

(22) Filed: Jul. 8, 2002

(65) Prior Publication Data

US 2003/0007742 A1    Jan. 9, 2003

(30) Foreign Application Priority Data

Jul. 9, 2001 (EP) .................................. 01440215

(51) Int. Cl.
*G02B 6/36* (2006.01)
*G02B 6/44* (2006.01)

(52) U.S. Cl.
USPC .................................. 385/80; 365/76; 365/89

(58) Field of Classification Search
USPC ............................................... 385/89, 76, 80
See application file for complete search history.

(56) References Cited

U.S. PATENT DOCUMENTS

| 4,162,821 | A | * | 7/1979 | Schumacher | 385/65 |
|---|---|---|---|---|---|
| 4,351,657 | A | | 9/1982 | Kimura et al. | |
| 4,732,446 | A | * | 3/1988 | Gipson et al. | 385/24 |
| 5,071,217 | A | * | 12/1991 | Birch | 385/33 |
| 5,367,593 | A | * | 11/1994 | Lebby et al. | 385/53 |
| 5,390,275 | A | * | 2/1995 | Lebby et al. | 385/132 |
| 5,428,704 | A | * | 6/1995 | Lebby et al. | 385/92 |
| 5,500,914 | A | * | 3/1996 | Foley et al. | 386/77 |
| 5,613,024 | A | * | 3/1997 | Shahid | 385/52 |
| 5,764,833 | A | | 6/1998 | Kakii et al. | |
| 5,834,494 | A | * | 11/1998 | Ham et al. | 514/339 |
| 5,953,477 | A | * | 9/1999 | Wach et al. | 385/115 |
| 6,088,498 | A | * | 7/2000 | Hibbs-Brenner et al. | 385/52 |
| 6,621,951 | B1 | * | 9/2003 | Zhao et al. | 385/30 |
| 6,932,517 | B2 | * | 8/2005 | Swayze et al. | 385/88 |

FOREIGN PATENT DOCUMENTS

| EP | 0794446 A2 | 9/1997 |
|---|---|---|
| WO | WO9957589 A1 | 11/1999 |

OTHER PUBLICATIONS

Patent Abstracts of Japan, vol. 009, No. 323 (P-414) Dec. 18, 1985 corresponding to JP 60 149015 (Sumitomo Denki Kogyo)dated Aug. 6, 1985.

* cited by examiner

*Primary Examiner* — Eric Wong
(74) *Attorney, Agent, or Firm* — Sughrue Mion, PLLC

(57) ABSTRACT

A connector for one or more optical fibers has a ferrule into which the optical fibers are glued directly with their outer cladding. No stripping of the fibers is required any longer before gluing them to the ferrule and thus, the difficulty of the fragility of the stripped fibers is overcome. The fibers are special fiber having a primary coating with smaller tolerances of ±2 microns. The fibers are arranged on a flexible foil which forms an optical overlay for a printed circuit board.

21 Claims, 3 Drawing Sheets

CONNECTOR FOR OPTICAL FIBERS

FIELD OF THE INVENTION

The invention relates to the field of opto-electronics and more particularly to a connector for one or more optical fibers on a circuit board. Moreover, the invention relates to a circuit board with one or more high-speed electronic components attached thereon, which are connected by means of optical fibers.

BACKGROUND OF THE INVENTION

For high speed electronic applications, the electrical interconnections are the bottleneck on a printed circuit boards (PCB) which limit data transfer rate between electronic components and from electronic components to the backplane. On the other hand, it can be expected that electronic components such as micro-processors or application specific integrated circuits (ASICs) become faster and faster in the next few years. An extrapolation of the clock rate of such electronic components plotted against a time scale is shown in FIG. 1 which is a diagram of the International Technology Roadmap for Semiconductors.

A widely accepted technical limit of the product of bitrate and distance for electrical interconnections is about 2.5 GBit/sec/meter. Therefore, higher transmission rates will be realized in the future with optical interconnection technology.

At present, there are different approaches known to realize optical interconnections. Some proposals are based on polymer planar multimode waveguides on a carrier foil which is able to be laminated within a standard multilayer PCB. This solution is quite near to the standard manufacturing process of a PCB and includes also surface mount technology for the board. A disadvantage is that such optical-electrical PCBs as well as surface mountable optical-electrical components are not yet available today, even not as research prototypes. It will thus take several years from now to develop these.

Another possible approach shown in FIG. 2 consists of a high speed board which has an optical overlay to realize the optical interconnections. High speed ASICs which process the data are closely located to the optical-electrical components such as Parallel Optical Links (POLs). The bitrate from and to the POLs can be up to 30 GBit/sec or even more. The optical overlay connects the POLs with either the backplane or makes interconnections between them.

In practice, the board will be manufactured in a standard process. In a further processing step, an optical overlay makes the optical interconnects as illustrated in FIG. 3, which is a picture from the company 3M. In this figure the overlay may be a foil with polymer waveguides but can also be a multiwire flexfoil, i.e., a flexible foil with optical fibers attached thereon. All components (POLs, Flexfoil, MT-Connector, and Optical Backplane connector for MT connector) needed for such an optical overlay are today available on the market as commercial products. Therefore, the shown optical interconnect on PCB via multiwire technology is available but is relative expensive, today. The reason for that is given in the mounting process of the MT-connector (MT: multi-fiber). For mounting an MT connector, the primary coating of the ribbon fiber has to be removed. However, an optical fiber without primary coating is very fragile which makes handling extremely difficult.

BRIEF DESCRIPTIONS OF THE INVENTION

It is therefore an object of the present invention to provide a connector for one or more optical fibers which eases mounting and handling and therefore allows manufacturing of high-speed circuit boards at commercially acceptable costs. Further objects of the present invention are to provide a corresponding circuit board and method of producing such connector.

These and other objects that appear below are achieved by a connector for one or more optical fibers which has a ferrule into which the optical fibers are glued directly with their outer cladding. No stripping of the fibers is required any longer before gluing them to the ferrule and thus, the difficulty of the fragility of the stripped fibers is overcome.

Advantages of the present invention include that the overall costs are reduced due to easier handling and better yield of manufacturing process.

BRIEF DESCRIPTION OF THE DRAWINGS

Preferred embodiments of the present invention will now be described with reference to the accompanying drawings in which.

DETAILED DESCRIPTION OF THE INVENTION

Figure 4A:
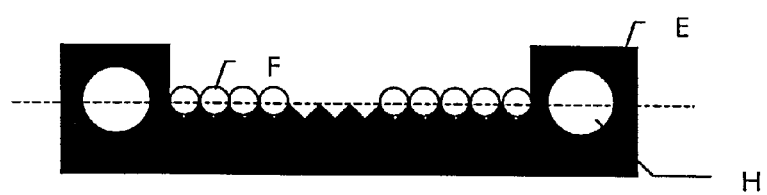
FIGS. 4a-c show three different ferrules with optical fibers glued thereto.
Figure 4B:
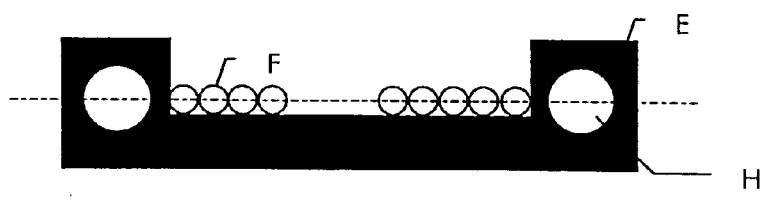
Figure 4C:
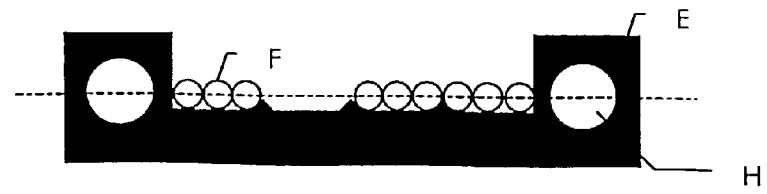

FIGS. 4a to 4c show a connector according to the present invention. It comprises a ferrule E into which optical fibers F are glued. The fibers F is a multimode fiber with a core having a diameter of 62.5 micron (1 micron=1/1000 mm), an inner cladding surrounding the core and having a diameter of 125 microns, and a primary coating surrounding the inner cladding and having a diameter of 180 microns. The core and inner cladding are made of silica (glass). The inner cladding has a refractive index slightly higher than the refractive index of the core. The primary coating is an organic material to protect the fiber against breakage or other kind of damage.

Conventional fibers are manufactured by drawing them under high temperature from a silica bait rod or tube called a blank. During the drawing process, the fiber is coated with an epoxy resin to form the primary coating. This primary coating varies in thickness typically about ±10 microns.

A basic idea of the present invention consists in gluing the fibers F directly into the ferrule E without removing the primary coating prior to gluing. This saves one processing step and the handling of the fiber is no problem. To do so, it is necessary to have a special fiber having a primary coating with smaller tolerances. As explained above, typical commercially available fibers have a tolerance of the outer diameter of the primary coating of ±10 microns. If such fibers are glued with their primary coating directly into a ferrule, the optical insertion loss would be unacceptable high.

Therefore, another basic idea of the invention is to use optical fibers with an improved tolerance of their outer diameter. Such special fibers can be produced by simply reducing the drawing speed during manufacturing. This allows to better control the coating step so that a tolerance of ±2 microns or even ±1 micron is achieved. Typical drawing speed of the fiber during manufactory is about 10% of the conventional drawing speed. Such a fiber has accurate enough dimensions for gluing it directly into a ferrule without removing the primary coating, first.

As manufacturing fibers at lower production speed would certainly increase the costs per meter, the invention is based on a tradeoff between increased fiber price and reduced mounting costs of the connector. The invention is further based on the recognition that the increased fiber price is over-compensated by savings due to the simplified mounting step, since for circuit board applications only few meters of fiber are required.

The ferrule E in FIG. 4a has V-grooves for the several fibers. The fibers F are glued directly into the corresponding V-grooves without stripping off the primary coating. This is the best solution and results in the most accurate connector.

FIGS. 4b and 4c show cheaper solutions but overall fiber location tolerance is higher as compared to FIG. 4a which leads to higher insertion loss, but which could also be tolerated in some applications. In FIG. 4b, the fibers are glued directly into one large gap in the ferrule. In FIG. 4c, the ferrule has four smaller gaps, each with a dimension to receive three fibers. All three ferrules have holes H for guide pins from the corresponding counterpart socket on the circuit board.

Figure 5:
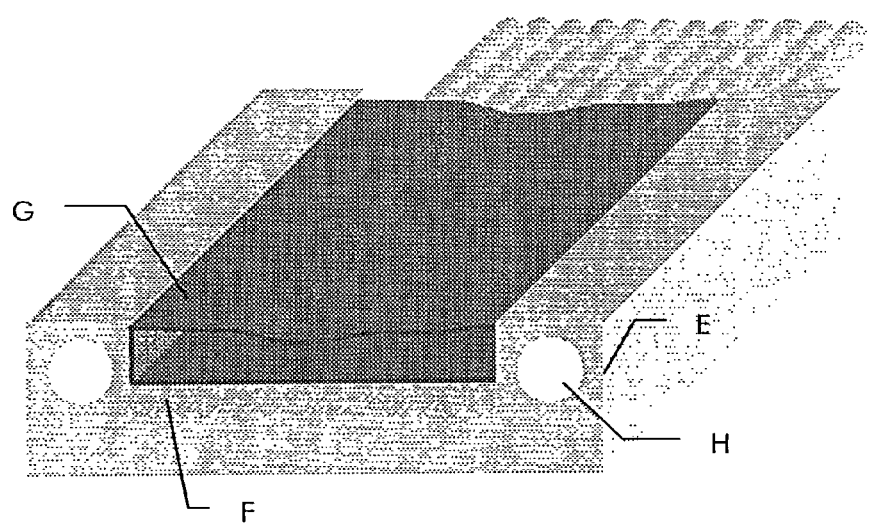
FIG. 5 shows a ferrule with optical fibers after gluing.

FIG. 5 shows a ferrule E with twelve fibers F attached to it after gluing. The twelve fibers lay in a gap of the ferrule E. The gap is filled above the fibers with a UV-curable resin G. To advantage, conventional fiber ribbons with twelve optical fibers can be used. Not shown in the figures are conventional outer parts and housing of the connector, which obviously will be assembled around the ferrule to build the complete connector.

Figure 1:
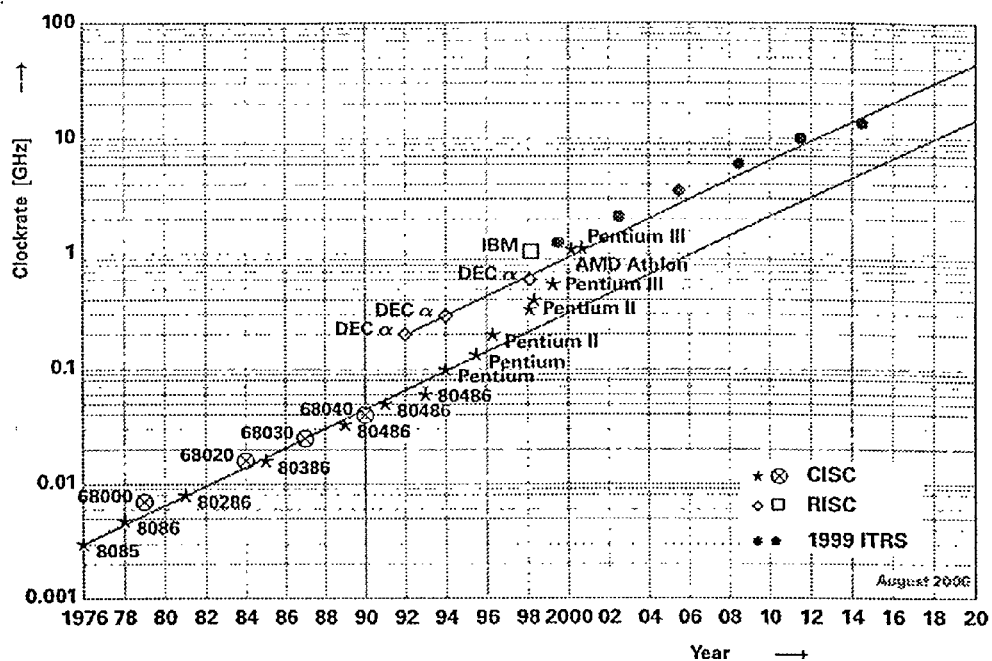
FIG. 1 shows in a diagram the clock rate of electrical semiconductor components against a time scale.
Figure 2:
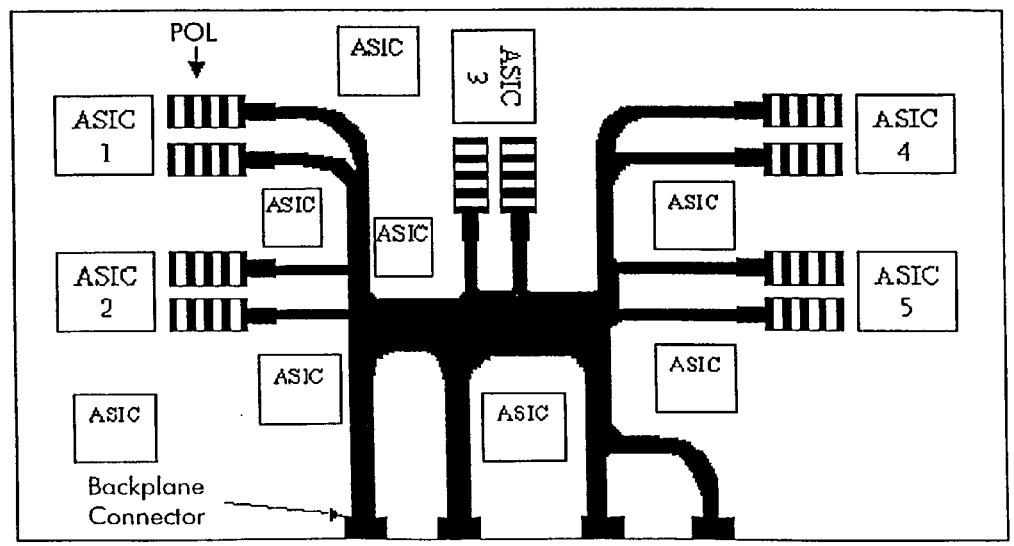
FIG. 2 shows a printed circuit board with optical interconnections.

FIG. 2 shows a printed circuit board with several ASICs attached thereon. Conventional Parallel Optical Link modules (POL) are arranged close to some of the ASICs. These allow optical interconnections and have optical sockets which correspond to the ferrules of the optical connectors presented above.

Figure 3:
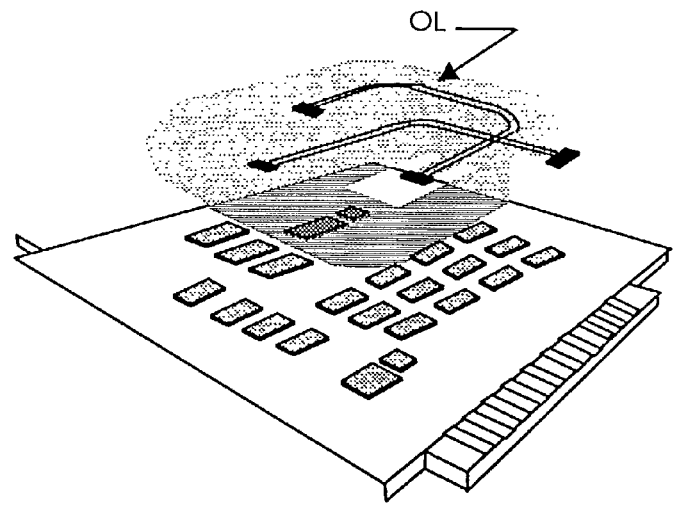
FIG. 3 shows a printed circuit board with an optical overlay forming the optical interconnections.

Several fiber ribbons with such connectors are arranged on a multiwire flexfoil to form an overlay for a circuit board as shown in FIG. 3. The connectors are plugged to the corresponding sockets of the POLs on the circuit board.

Having now described several embodiments of the invention, it should be understood that the invention is not limited to the details of the embodiments.

On the contrary, changes and equivalents of material, design and manufacturing steps are apparent to those skilled in the art having understood the above principles. Without claiming completeness, following changes could for example be envisaged. Use of plastic fibers instead of silica fibers; use of different kind of glue; one or more single fibers instead of a fiber ribbon; use of loose fibers instead of flexfoil; higher or lower tolerances of the outer fiber diameter, depending on the tolerable coupling losses; different form and size of connector and ferrule, circuit board with any kind of high-speed electrical and electro-optical components; and many more.

Compared to conventional manufacturing methods which remove fiber coating, the present invention may have slightly higher optical insertion loss but is considerably cheaper. Compared to an optical-electrical PCB having optical waveguides inside the PCB, the invention offers smaller optical insertion loss and all required components are in principle available today.

What is claimed is:

1. A connector assembly comprising a connector and one or more optical fibers,
    wherein at least one of said optical fibers comprises:
        a fiber core,
        an inner cladding surrounding said core, and
        a primary coating surrounding said inner cladding,
    and wherein said connector comprises a ferrule into which said one or more optical fibers are glued, wherein said one or more fibers are glued with their unstripped, straight fiber end into said ferrule with a glue adhering said primary coating to said ferrule,
    and wherein said unstripped fiber end is characterized in that said primary coating remains intact to said fiber end.

2. A connector assembly according to claim 1, wherein said primary coating of said one or more fibers has a manufacturing tolerance of ±2 microns or less in diameter.

3. A connector assembly according to claim 1, wherein said one or more optical fibers are glued into said ferrule using an UV-curable resin.

4. A connector assembly according to claim 1, wherein said one or more optical fibers are arranged in a ribbon fiber.

5. A circuit board assembly comprising one or more electrical high-speed components connected by means of optical fibers comprising a fiber core, an inner cladding surrounding said core and a primary coating surrounding said inner cladding, wherein said optical fibers are glued with their unstripped, straight fiber end into a ferrule and said ferrule is connected to a corresponding counterpart on the circuit board, and
    wherein said unstripped fiber end is characterized in that said primary coating remains intact to said fiber end.

6. A circuit board according to claim 5, wherein said optical fibers are attached on a flexible foil building an overlay on top of the circuit board.

7. An optical overlay for a circuit board, comprising a flexible foil with one or more optical fibers attached thereon, said fibers comprising a fiber core, an inner cladding surrounding said core and a primary coating surrounding said inner cladding, wherein said optical fibers are glued with their unstripped, straight fiber end into a ferrule of a connector, and
    wherein said unstripped fiber end is characterized in that said primary coating remains intact to said fiber end.

8. A method of manufacturing a connector assembly comprising a connector and one or more optical fibers where said fibers comprise a fiber core, an inner cladding structure surrounding said core and a primary coating surrounding said inner cladding, the method comprising the step of gluing said fibers with their unstripped, straight fiber end directly into a ferrule,
    wherein said unstripped fiber end is characterized in that said primary coating remains intact to said fiber end.

9. A connector assembly according to claim 1, wherein said primary coating of said one or more fibers has a manufacturing tolerance of ±1 microns or less in diameter.

10. The connector assembly according to claim 1, wherein said connector further comprises a plurality of V-shaped grooves into which at least some of said one or more unstripped fibers are positioned.

11. The connector assembly according to claim 1, wherein said connector further comprises a groove into which all of said one or more unstripped fibers are positioned.

12. The connector assembly according to claim 1, wherein said connector further comprises a plurality of grooves, wherein each of said grooves is capable of accommodating more than one of said one or more unstripped fibers.

13. A connector assembly comprising one or more optical fibers and a connector connecting at least one of said optical fibers to an electrical component, comprising:
    at least one ferrule into which one or more optical fibers are adhered, wherein said one or more optical fibers comprise a fiber core, an inner cladding surrounding said core, and a coating surrounding said inner cladding, and wherein said coating on said one or more fibers is unstripped when said one or fibers are in a fitted positioned within said ferrule, wherein said one or more unstripped fibers are characterized in that said coating remains intact inside said ferrule to said fiber end in said fitted position.

14. A method of adhering an optical fiber to a connector comprising at least one ferrule, where said fiber comprises a fiber core, an inner cladding surrounding said core, and a coating surrounding said inner cladding, said method comprising:

positioning said optical fiber into said ferrule, and
adhering said optical fiber to said ferrule,
wherein said coating on said optical fiber remains intact to an end of said fiber inside said ferrule during both said positioning and adhering steps.

15. A connector assembly according to claim 13, wherein said coating of said one or more fibers has a manufacturing tolerance of ±2 microns or less in diameter.

16. A connector assembly according to claim 13, wherein said coating of said one or more fibers has a manufacturing tolerance of ±1 microns or less in diameter.

17. A connector assembly according to claim 13, wherein said one or more optical fibers are glued into said ferrule using an UV-curable resin.

18. A connector assembly according to claim 13, wherein said one or more optical fibers are arranged in a ribbon fiber.

19. The connector assembly according to claim 13, wherein said connector further comprises a plurality of V-shaped grooves into which at least some of said one or more unstripped fibers are positioned.

20. The connector assembly according to claim 13, wherein said connector further comprises a groove into which all of said one or more unstripped fibers are positioned.

21. The connector assembly according to claim 13, wherein said connector further comprises a plurality of grooves, wherein each of said grooves is capable of accommodating more than one of said one or more unstripped fibers.

* * * * *